C. VALLONE & F. R. ROGERS.
APPARATUS FOR HEATING TUBES.
APPLICATION FILED FEB. 21, 1911.
1,052,863.
Patented Feb. 11, 1913.
2 SHEETS—SHEET 2.
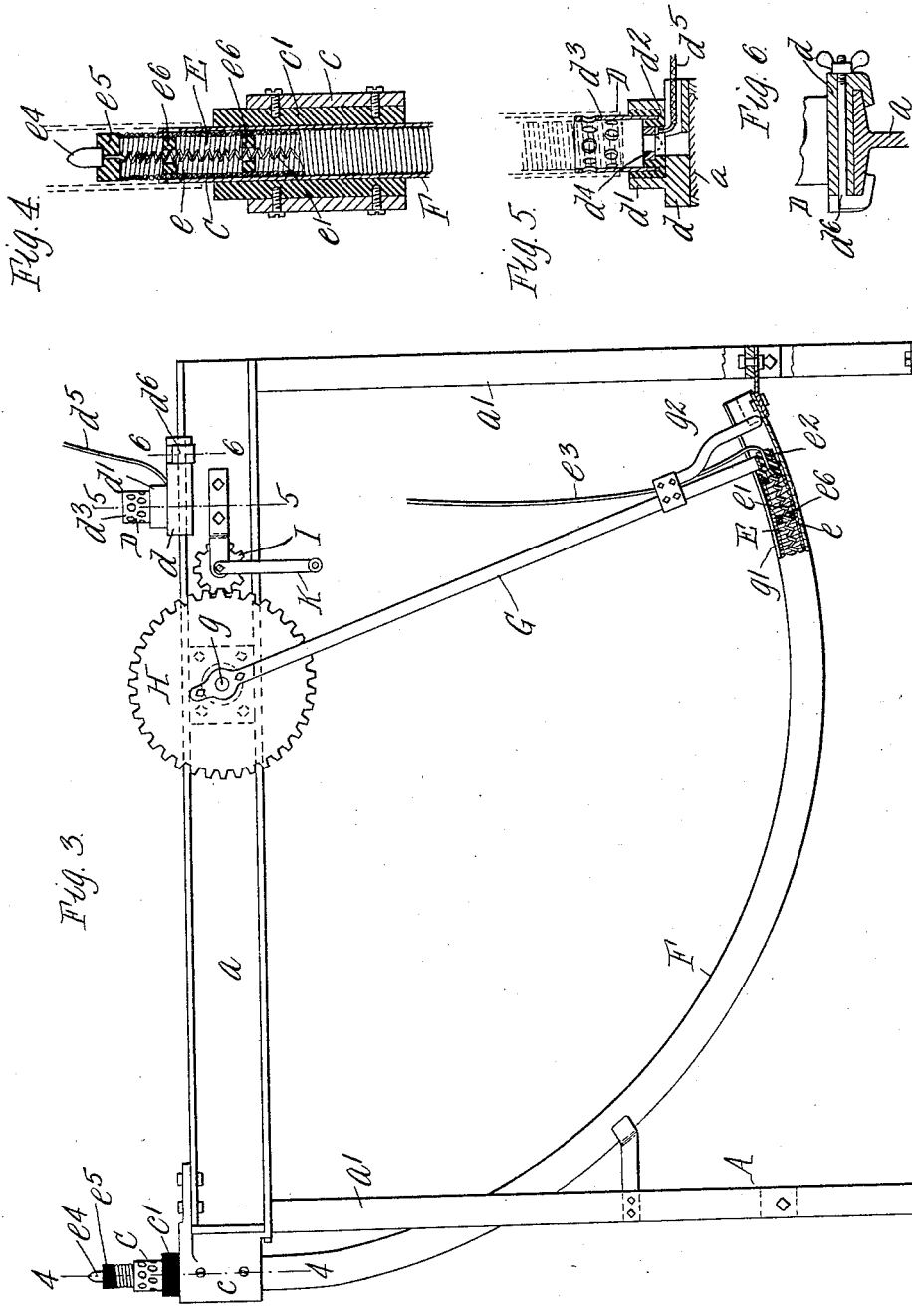

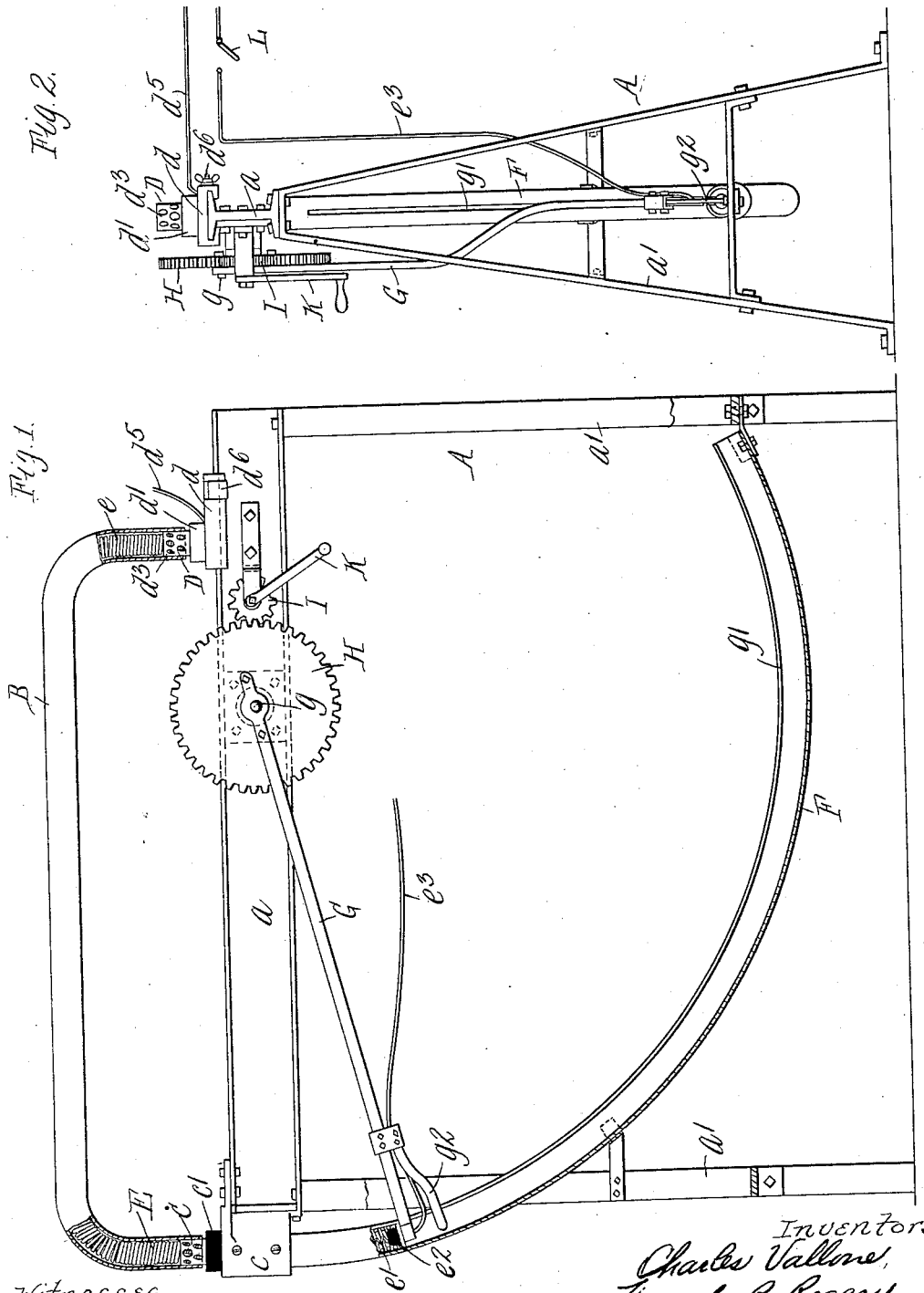

UNITED STATES PATENT OFFICE.

CHARLES VALLONE AND FRANK R. ROGERS, OF BUFFALO, NEW YORK, ASSIGNORS TO BARCALO MANUFACTURING COMPANY, OF BUFFALO, NEW YORK.

APPARATUS FOR HEATING TUBES.

1,052,863.      Specification of Letters Patent.      Patented Feb. 11, 1913.

Application filed February 21, 1911. Serial No. 609,849.

*To all whom it may concern:*

Be it known that we, CHARLES VALLONE and FRANK R. ROGERS, citizens of the United States, residing at Buffalo, in the county of Erie and State of New York, have invented a new and useful Improvement in Apparatus for Heating Tubes, of which the following is a specification.

Polished brass articles, such, for example, as the tubes of brass bedsteads, are usually lacquered to prevent them from tarnishing. It is ordinarily necessary, especially when using English lacquer, to apply several coats of the lacquer to the bedstead tubes in order to insure an adequate coating thereof. Each coat of the lacquer must dry or harden before the next coat can be applied and it is therefore desirable to maintain the tubes at such a temperature during the lacquering operation that the volatile constituent of the lacquer will evaporate at once so that there will be no loss of time in waiting for one coat to harden before applying the next coat.

This invention relates more particularly to apparatus for heating bent or curved brass bedstead tubes and maintaining them at a suitable temperature while they are being lacquered, but it is not necessarily restricted to the heating of brass bedstead tubes for this purpose, nor to the heating of bent or curved tubes.

The object of the invention is to produce an apparatus of this kind upon which a tube can be readily secured in a position to be operated upon, and which is provided with a heating device or member adapted to be inserted into the tube for heating it to the required temperature and maintaining it at that temperature while it is being lacquered or otherwise operated upon.

Briefly stated, the apparatus comprises two posts or holders with which the opposite ends of the tube are engaged for holding the tube in position to be lacquered, and an electric heating coil or device which is adapted to be shoved into the tube through one end thereof. Electrical connections are provided whereby, when the heating coil or device has been inserted into the tube, an electric current can be passed through it for heating the coil or device and the surrounding tube. The heating coil or device is preferably flexible, thereby adapting it to be readily shoved into curved or bent tubes.

In the accompanying drawings, consisting of two sheets: Figure 1 is an elevation, partly in section, of an apparatus embodying the invention, showing a tube in place thereon and the parts of the apparatus in their operative positions. Fig. 2 is an end view of the apparatus. Fig. 3 is an elevation, partly in section of the apparatus. Fig. 4 is a section on line 4—4, Fig. 3, on an enlarged scale, showing one of the supports for the tube and one end of the heating member. Fig. 5 is a section on line 5—5, Fig. 3, on an enlarged scale, showing the movable tube support. Fig. 6 is a section on line 6—6, Fig. 3, on an enlarged scale, showing means for clamping the movable tube support in place on the machine.

Like reference characters refer to like parts in the several figures.

The apparatus shown in the drawings is more particularly adapted to operate on U-shaped tubes whose open ends face in the same direction and are parallel to each other, but it will be evident that by slight changes the machine could be adapted to operate on bent or curved tubes of other shapes and on straight tubes.

A represents the frame or stand of the apparatus which may be of any suitable form and construction. The frame shown consists of a horizontal bed or table *a* of I-shape in cross-section supported by suitable upright legs or standards *a'*. A tube B, Fig. 1, which is to be lacquered, is placed on the apparatus with its open ends downward and resting on suitable tube supports or holders C and D secured on the bed *a* of the apparatus.

E represents the flexible heating coil or device which is arranged to move endwise in a tubular sheath or guide F secured on the frame beneath the bed *a* with one end thereof connecting with the lower end of one of the tube supports or holders, for instance, the holder C, which is tubular, so that the heating coil or device is adapted to be moved out of its sheath F through the tubular holder C into the tube B to be heated.

In the construction illustrated in the drawings, see Fig. 4, the tube support or holder C is formed by the upwardly projecting end of the sheath or guide F which is held by a surrounding sleeve *c* which is suitably secured to one end of the bed *a*. The upper portion of the sheath or guide F is electrically insulated from the securing sleeve $c$ by an insulating bushing $c'$ secured in the sleeve, and the end of the sheath or guide which extends above the insulating bushing forms the support or holder C over which one end of the tube B to be lacquered is adapted to be slipped and by which the tube is held in position to be lacquered. The holder C is preferably perforated to allow the heat from the heating device E to act on the ends of the tubes, as well as on the intermediate portions thereof.

The other tube support or holder D, see Figs. 5 and 6, comprises a base portion $d$ which is slidably mounted in the bed $a$ so that it can be adjusted to different positions thereon, and is provided with a socket $d'$ in which an insulating bushing $d^2$ is held. A short tubular stud or nipple $d^3$ is secured in the insulating bushing $d^2$ and constitutes the holding means for the other end of the tube B. A contact $d^4$, which may be of annular or of any other suitable shape, forms a terminal for an electric circuit and is suitably secured in the insulating bushing $d^2$ and insulated thereby from the other parts of the machine. This terminal is connected by a conductor $d^5$ to any suitable source of electric current supply. Any suitable means, such, for instance, as a clamping bolt $d^6$, may be employed for adjustably securing the movable support D to the bed of the machine. The support or holder D can thus be moved to and secured in the different positions on the bed $a$ required for holding tubes B of different lengths.

By making the tube supports or holders of the construction shown so that the tube B telescopes over the supports or holders, it is evident that none of the lacquer can enter into the supports or holders and thus clog up or otherwise interfere with the operation of the apparatus. This is important in the case of the support D, where the lacquer is prevented from covering the contact $d^4$ and thus preventing a proper electrical contact thereof with the end of the heating coil or device.

The flexible heating coil or device E shown consists of an outer spring wire coil $e$ within which is located an inner resistance coil $e'$ which is adapted to be heated when an electric current is passed through the same. The outer coil $e$ is slightly less in diameter than the interior diameter of the tubes to be heated so that the coil can be readily inserted and moved lengthwise therein. One end of the resistance coil $e'$ is secured in an insulating bushing $e^2$ and connected by a conductor $e^3$ to the source of current supply, and the other end is connected to a contact plug or piece $e^4$ secured in an insulating plug $e^5$ which is suitably fastened to the adjacent end of the outer coil $e$ of the heating device. When the heating device is inserted into a tube B to be heated, the plug $e^4$ engages with the contact $d^4$ of the movable support or holder D, whereby a circuit is completed from the conductor $e^3$ through the resistance coil and contacts $e^4$ and $d^4$ to the conductor $d^5$. The inner resistance wire is held out of contact with the outer coil of the heating device and insulated therefrom by a number of insulating bushings or rings $e^6$ located within the coil $e$ at suitable distances apart. These bushings do not interfere with the flexing of the heating device. This construction of the heating member has been found to be very satisfactory in operation, but other constructions may be used, if desired.

The heating coil or device E is preferably operated to move it into and withdraw it from the tube to be heated, by a swinging arm G which is suitably pivoted at $g$ on the bed $a$. The sheath or guide F is curved concentrically with the pivot of the operating arm G and the arm extends into the sheath or guide through a longitudinal slot $g'$ therein and is secured to the insulating bushing $e^2$ at the rear end of the heating coil or device. A guide piece $g^2$, secured to the arm G, also enters the slot and helps to guide the movement of the arm. The pivoted end of the arm G is secured to a gear H, which is adapted to be driven by a pinion I suitably journaled on the bed $a$. A crank K is attached to the pinion I. When the gear H is rotated by turning the crank K, the end of the arm G will move the heating coil or device in the sheath or guide F either direction, depending upon the direction of rotation of the crank. Any other suitable mechanism may be employed for actuating the heating coil or device.

In the operation of the apparatus, the tube B to be heated is first placed in position on the supports or holders C and D after which the crank K is turned to move the heating coil or device into the tube B until the contacts $d^4$ and $e^4$ are in engagement. The current is then passed through the heating coil or device for heating the tube by closing a controlling switch L, or other suitable means. When the tube has reached the required temperature, the lacquer is applied. After the tube has been lacquered, the current is first turned off and the heating coil or device is withdrawn from the tube B by turning the crank K in the opposite direction, after which the tube may be removed.

The apparatus described is easily operated and it enables the tubes to be completely lacquered in one operation, doing away with the necessity of reheating the tube in a furnace after each coat has been applied. By heating the tubes by a separate heating member inserted therein, instead of passing the current directly through the tube itself, the apparatus is much more reliable in action, since the contacting surfaces at the end of the member and on the movable support are not liable to become covered with the lacquer and thus prevent the flow of current. When the current is passed through the tube itself, difficulty is experienced in making good electrical contacts at the ends of the tubes and consequently some of the tubes will not be heated to the same temperature as others, which will result in a lack of uniformity in the work; also since the electrical resistance varies with different grades and sizes of tubes, a constant adjustment of some kind of current-regulating device would be required, to heat all tubes to the same temperature. In the apparatus described, the resistance of the heating member is constant and consequently no adjustment of the current strength is required, so that no skilled labor is required to operate the apparatus.

While the apparatus has been described as provided with an electrical heating member, yet a member heated by any other suitable means which is movably mounted and adapted to be moved into and out of a tube as described may be used if desired.

We claim as our invention:

1. In an apparatus for heating tubes, the combination of a frame, means for removably supporting a tube thereon, a flexible heating device which is movably supported by the frame, and reciprocatory mechanism for moving the heating device into and out of the tube, substantially as set forth.

2. In an apparatus for heating tubes, the combination of a frame, means for removably supporting a tube thereon, an electric heating device which is movably supported by the frame and is adapted to be heated substantially throughout its length, and reciprocatory mechanism for moving said heating device into and out of the tube, substantially as set forth.

3. In an apparatus for heating tubes, the combination of means for removably supporting a tube, a heating device movably supported on said supporting means and adapted to be inserted into the tube, electrical means for heating said device substantially throughout its length after the same has been inserted into said tube, and an operating device which is operatively connected with said supporting means for inserting the heating device into the tube, substantially as set forth.

4. In an apparatus for heating bent tubes, the combination of means for supporting a tube, a flexible heating coil adapted to be inserted into the tube, electrical means for heating said coil, and means connected with said supporting means for inserting the coil into the tube, substantially as set forth.

5. In an apparatus for heating tubes, the combination of means for supporting a tube, a device adapted to be inserted into the tube and comprising an inner coil which is electrically heated, and an outer coil forming a flexible container for said heating coil and which is electrically insulated therefrom, substantially as set forth.

6. In an apparatus for heating tubes, the combination of means for supporting a tube, an electrical heating device which is adapted to be inserted into the tube, means for inserting the device into the tube, and means for closing a circuit through said heating device, substantially as set forth.

7. In an apparatus for heating tubes, the combination of means for supporting a tube, an electrical heating device which is adapted to be inserted into the tube, means for inserting the device into the tube, and means which close a circuit through said heating device as soon as the same is in place in the tube, substantially as set forth.

8. In an apparatus for heating tubes, the combination of means for supporting a tube, an electrical heating device which is adapted to be inserted into the tube, and means which are adapted to insert said heating device into the tube and cause a circuit to be closed when the device is in place in the tube, substantially as set forth.

9. In an apparatus for heating tubes, the combination of supports which are adapted to engage the ends of a tube and hold said tube in position to be operated upon, one of said supports being hollow, a heating device adapted to be inserted into said tube through one of said hollow supports, said heating device consisting of outer and inner parts, said inner part being insulated from said outer part and being adapted to be heated by an electric current, and a contact device in said other support with which one end of said heating member is adapted to engage to complete a circuit through said inner part thereof, substantially as set forth.

10. In an apparatus for heating tubes, the combination of means for supporting a tube, an electric heating device which is connected with a source of current and is adapted to be moved into the tube, a contact device at the leading end of said heating device, and a second contact connected with said source of current and adapted to be engaged by said first contact when said heating device is inserted in the tube, substantially as set forth.

11. In an apparatus for heating tubes, the combination of means for supporting a tube, a flexible heating device which is adapted to be inserted into said tube, a guide by which said heating device is movably supported, and means for moving said heating device into and out of said tube, substantially as set forth.

12. In an apparatus for heating tubes, the combination of tubular supports for holding a tube, a flexible electric heating device which is adapted to be inserted into said tube through one of said tubular supports and to enter into said other support, a contact on the end of said heating device, and a contact in said other tubular support with which said first mentioned contact is adapted to engage, substantially as set forth.

13. In an apparatus for heating tubes, the combination of a bed, supports mounted on said bed and adapted to engage with the ends of the tube to support said tube, one of said supports being adjustable lengthwise of said bed, and the other support being hollow, and a heating device which is heated substantially throughout its length and is adapted to pass from said hollow support into said tube, substantially as set forth.

14. In an apparatus for heating tubes, the combination of means for supporting a tube, an electrical heating device adapted to be inserted into the tube, and means controlled by the movement of the heating device into the tube for closing an electrical heating circuit through said heating device, substantially as set forth.

15. In an apparatus for heating bent tubes, the combination of supports which are adapted to engage the opposite ends of a tube and removably hold the tube in position to be operated upon, one of said supports being hollow, and a movably mounted flexible heating device which is heated substantially throughout its length and is adapted to be inserted into said tube through said hollow support, substantially as set forth.

16. In an apparatus for heating tubes, the combination of means for supporting a tube and a heating device adapted to be inserted into said tube and comprising an outer coil of wire, an electric heating member located within said coil, and insulating bushings located within said outer coil at suitable intervals with intervening air spaces between said bushings, said bushings serving to insulate said heating member from said outer coil, substantially as set forth.

17. In an apparatus for heating bent tubes, the combination of a frame, means for removably supporting a tube thereon, a flexible electrical heating device which is movably supported by said frame, and reciprocatory mechanism for moving said heating device into and out of said tube, substantially as set forth.

Witness our hands, this 14th day of February, 1911.

CHARLES VALLONE.
FRANK R. ROGERS.

Witnesses:
A. W. KIRTON,
C. L. HYSLOP.

Copies of this patent may be obtained for five cents each, by addressing the "Commissioner of Patents, Washington, D. C."